April 15, 1969   K. V. SCHMITTLE   3,438,214
THERMOELECTRIC TEMPERATURE CONTROL SYSTEM
Filed June 16, 1967   Sheet 1 of 2
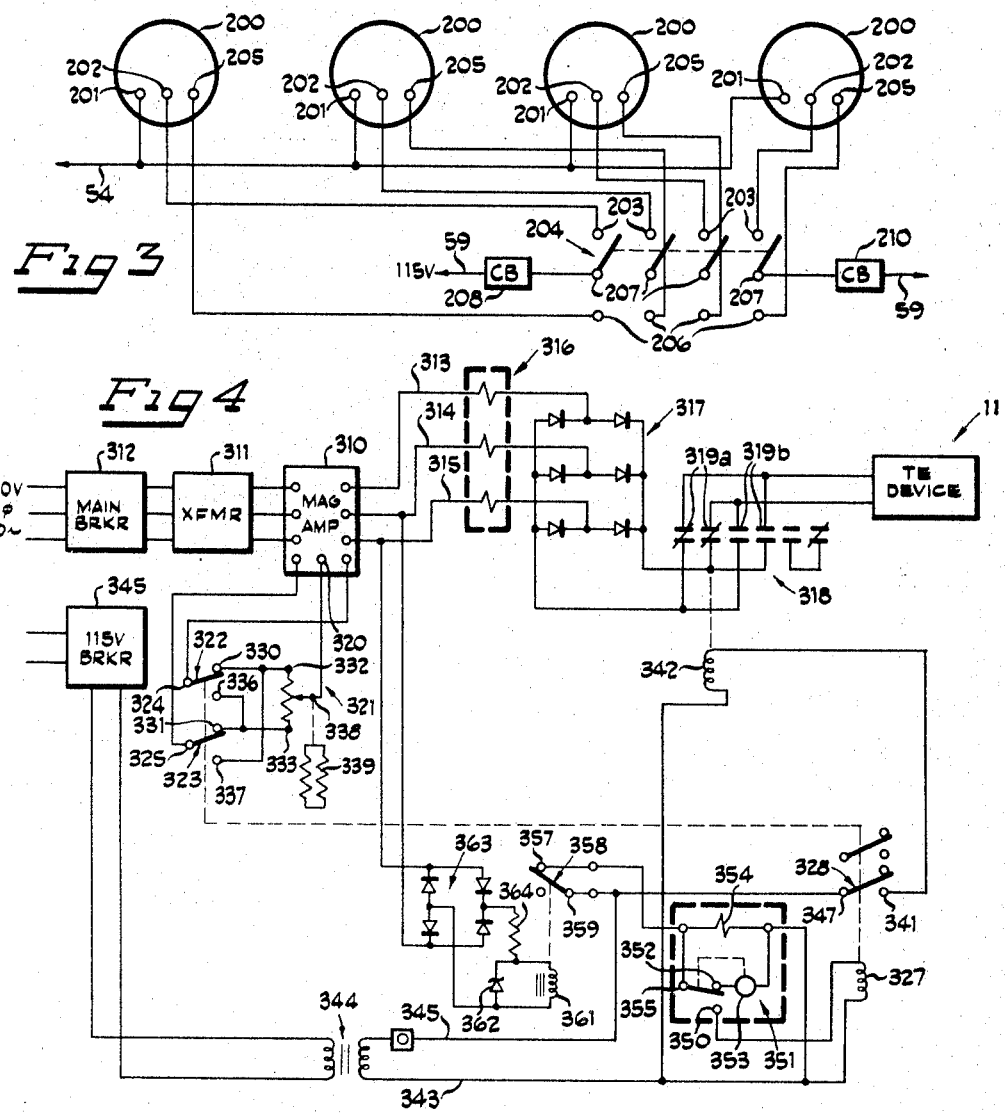
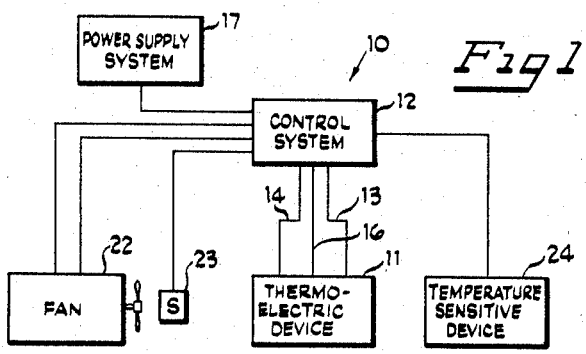
INVENTOR
KARL V. SCHMITTLE
BY *Thomas B. Hunter*
ATTORNEY United States Patent Office 3,438,214
Patented Apr. 15, 1969

3,438,214
THERMOELECTRIC TEMPERATURE CONTROL SYSTEM
Karl V. Schmittle, York, Pa., assignor to Borg-Warner Corporation, Chicago, Ill., a corporation of Illinois
Filed June 16, 1967, Ser. No. 646,709
Int. Cl. F25b 21/02
U.S. Cl. 62—3                    8 Claims

ABSTRACT OF THE DISCLOSURE

This disclosure involves an automatic control system for a thermoelectric temperature conditioning device for both cooling and heating of a substance flowing therethrough. The control system includes a means for automatically reversing from heating to cooling or vice versa and has a thermostat which senses the temperature of the conditioned substance at the output of the device and compares the temperature sensed wtih a predetermined reference temperature. The control device then automatically causes the thermoelectric system to increase or decrease its heating or cooling, to maintain the output temperature approximately equal to the reference temperature.

This invention relates to a thermoelectric temperature control system and more particularly to a thermoelectric system for conditioning the temperature of a substance such as air and for maintaining the temperature of the conditioned substance at a predetermined level, regardless of the temperature of the surrounding vicinity. The system is particularly useful as an air conditioning system wherein the temperature of outflowing air is constantly maintained very close to a desired pre-set temperature.

Previous temperature control systems have been constructed, of course, for heating or cooling of substances, but the present invention makes use of the unique reversibility feature of thermoelectric devices. It provides an efficient, dependable, and safe construction of a thermoelectric system which will supply heat when necessary and remove heat when necessary to maintain the output of conditioned substance at a substantially constant temperature.

A principal object of this invention is to provide an electrical control system in connection with a thermoelectric air tempering unit which is effective to maintain the temperature of the air output substantially constant. Another object of the present invention is to provide a thermoelectric temperature control system having control means for varying the voltage across the thermoelectric modules therein in response to slight temperature variations in the temperature conditioned substance therein.

Another object of the invention is to provide means for reversing the polarity of the thermoelectric voltage to thereby reverse the action of the thermoelectric system in response to temperature charges in the conditioned substance.

Still another object of the invention is to provide means for supplying a variable D.C. voltage across the thermoelectric modules therein.

A still further object of the invention is to provide safety devices to prevent possible overheating of the temperature control system.

Another object of the invention is to provide a timing device for facilitating the proper reversal of voltage across the thermoelectric modules therein.

Another object is to provide a temperature anticipating device for supplying heat to the temperature sensitive device of the control means in anticipation of a rise in temperature of the temperature conditioning element to facilitate a smooth and gradual rise in said temperature.

Another object of the invention is to provide a magnetic amplifier voltage supply means for supplying a readily controlable voltage to the thermoelectric modules of the system.

This invention contemplates other objects, features and advantages which will become more fully apparent from the following detailed description taken in conjunction with the accompanying drawings which illustrate certain preferred embodiments and in which:

FIGURE 1 is a block diagram of an air conditioning system constructed according to the principles of this invention;

FIGURE 3 is a circuit diagram of a modified fan motor circuit for the air conditioning system of FIGURE 1; and FIGURE 4 is a circuit diagram of a modified portion of the air conditioning system of FIGURE 1.

Figure 2:
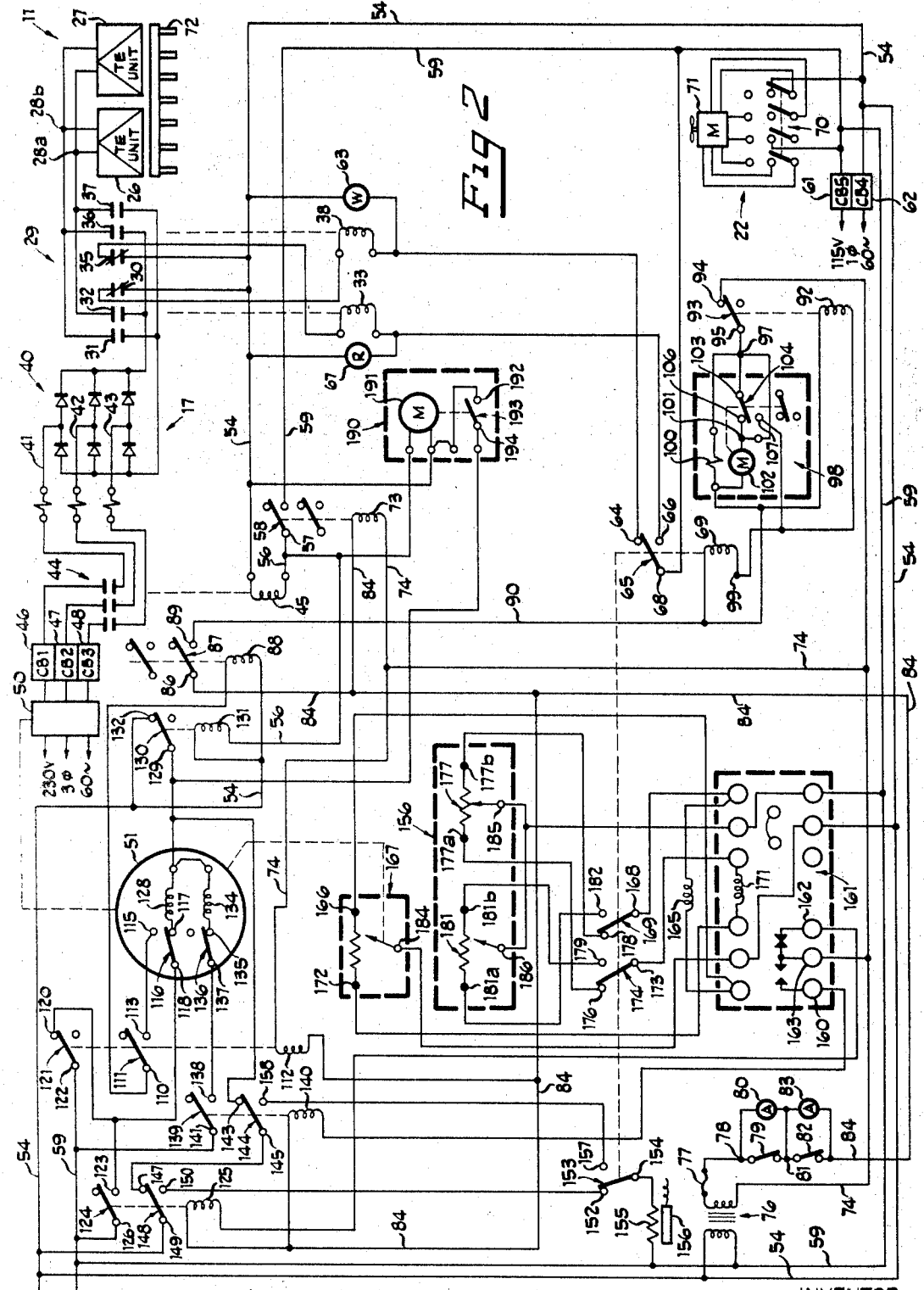
FIGURE 2 is a circuit diagram of the air conditioning system of FIGURE 1.

Reference numeral 10 generally designates a thermoelectric air conditioning system constructed according to the principles of this invention and shown diagrammatically in FIGURE 1. The system 10 comprises a thermoelectric device 11 connected to a control system 12 by means of two power supply wires 13 and 14 and a control wire 16. The control system 12 is connected to a power supply system 17 and is also connected to a fan unit 22, a sail switch 23, and a temperature sensitive device 24. The operation of the air conditioning system 10 will be explained in detail in connection with FIGURE 2, but in general the system 10, when operative, maintains by means of the thermoelectric device 11 an outflow of air at a relatively constant preset temperature. The fan unit 22 forces air into proximity with the thermoelectric device 11, where it is conditioned and then forced out of the unit. The sail switch 23 closes only when the fan 22 is turned on, and power is supplied to the thermoelectric device 11 only when sail switch 23 is closed. The temperature sensitive device 24 senses the temperature of the conditioned air leaving the thermoelectric device 11 and develops an output which is transmitted to a comparing portion of the control system 12, where the temperature sensed is compared with a pre-determined reference temperature. This comparison is used by the control system 12 to maintain a relatively constant temperature output of conditioned air from the system 10.

FIGURE 2 shows a detailed circuit diagram of the system 10, wherein two thermoelectric modules 26 and 27 of the thermoelectric device 11 have parallel end terminals 28a and 28b, connected to a relay switch 29 having a normally closed contact pair 30 and normally open contact pairs 31 and 32 controlled by a relay coil 33, and having a normally closed contact pair 35 and normally open contact pairs 36 and 37 controlled by a relay coil 38. The thermoelectric modules 26 and 27, which are connected in parallel, have their end terminals 28a and 28b connected across individual contacts from each of the pairs 31 and 32, and across opposite individual contacts from each of the pairs 36 and 37. The contacts of the pairs 31 and 32, and of the pairs 36 and 37 are connected across the outputs of a three phase diode bridge rectifier 40 in the power supply system 17. Rectifier 40 has input lines 41, 42 and 43 connected through a triple pole relay switch 44 controlled by a relay coil 45 and connected through three circuit breakers 46, 47 and 48 to three outputs of a variable voltage auto transformer 50. The latter has a movable contact mechanically connected to a drive motor 51 and is connected across a three phase, 230 volt, 60 cycle A.C. voltage supply source.

The relay switch 44 is controlled by a relay coil 45 having one end connected to a line 54 and another end connected to line 56, which is connected through the normally open contact pair 57 of a relay switch 58 to a line 59. Lines 54 and 59 are connected through circuit breakers 61 and 62 across a 115 volt, single phase, 60 cycle power source. Line 54 is connected through the normally closed contact pair 30 to one terminal of the relay coil 38 and through the normally closed contact pair 35 to one terminal of the relay coil 33. The opposite terminal of relay coil 38 is connected through a small white indicating light 63 to line 54 and also to one stationary contact 64 of a stepping switch 65. Another stationary contact 66 of switch 65 is connected to the opposite pole of the relay coil 33, which is also connected through a small red indicating light 67 to line 54, and a movable contact 68 of switch 65 is connected to the line 59. Stepping switch 65 is a two-position stepping switch which steps from one position to the other whenever a coil 69 thereof is energized.

The lines 54 and 59 are connected through a switch 70, which may be a four pole double through switch, of the fan 22 to a fan motor 71, for supplying A.C. power to the fan 22 and for providing high, low, and off settings of fan 22.

It should be noted that the relay switch 29 is constructed in such a manner that when relay coil 33 is energized, contact pair 30 is open so that relay coil 38 cannot be energized, and when relay coil 38 is energized, contact pair 35 is open so that relay coil 33 cannot be energized. Relay coil 38 is energized when stepping switch 65 is in its de-energized position, contact 68 engaging contact 64, and this corresponds to the cooling mode of the system 10, for voltage is applied to the thermoelectric modules 26 and 27 through the contact pairs 36 and 37 of switch 29 with a polarity to cause cooling of a heat exchange sink 72 adjacent one portion thereof. When relay switch 65 is in its energized position, corresponding to the heating mode of the system 10, coil 33 is energized and voltage is applied to the modules 26 and 27 in an opposite polarity through the contact pairs 36 and 37 of the relay switch 29.

A relay coil 73 controlling the relay switch 58 has one terminal connected to a line 74, which is connected to one terminal of the secondary winding on a transformer 76, the primary winding of which is connected between the lines 54 and 59 to receive a 115 volt, A.C. voltage. The secondary of transformer 76 produces a 24 volt A.C. voltage thereacross. The other terminal of the transformer secondary winding connected through a fuse 77 to a terminal point 78, which is connected through a parallel combination of a sail switch 79 and an amber indicating light 80 to a terminal point 81, which is in turn connected through a parallel combination of a plurality of normally closed series safety switches 82 and another amber indicating light 83 to a line 84. Line 84 is connected to the opposite terminal of the relay coil 73 of relay 58, and when all the switches 79 and 82 are closed and circuit breakers 61 and 62 are closed, a 24 volt, single phase, 60 cycle A.C. voltage exists across the lines 74 and 84, to supply the voltage for operation of many components in the control system 12. Sail switch 79 is closed by means of moving air pushing its contacts together, and this occurs when fan 22 is turned on in either its high or low setting, since sail switch 79 is located in the air circulating path of the system 10.

The line 84 is connected to a movable contact 86 of a relay switch 87 having a coil 88 and a stationary contact 89. The latter is connected through line 90 to one terminal of the coil 69 of the stepping switch 65, and also to one terminal of a time delay relay coil 92 of a relay switch 93. The latter has a stationary contact 94 connected to line 74 and a normally closed movable contact 95 connected to an input terminal 97 of a timing device 98. The other terminal of time delay relay coil 92 is connected to a terminal 99 of the coil 69.

The input terminal 97 of the timing device 98 is connected to one terminal of an electromagnetic clutch 100, the other terminal of which is connected to the contact point 89 through line 90. Terminal 97 is also connected to one terminal 101 of a timing motor 102, the other terminal of motor 102 being connected to the contact point 89. Terminal 97 is also connected to a movable contact 103 of a single pole double throw microswitch 104 controlled mechanically by the timing motor 102 and having one fixed contact 106 connected to the terminal 101 of motor 102 and another fixed contact 107 connected to the terminal 99 of stepping coil 69. When the relay switch 88 is closed and the A.C. voltage between lines 74 and 90 is applied across the clock 100 and timing motor 102 through the normally closed switch 95, the timing device 98 is activated and begins to run. A certain period of time after the timing device 98 is activated, the timing motor 102 causes the microswitch 104 to engage contact 103 with contact 107 and thereby energize time delay relay coil 92 and stepping switch coil 69. Relay coil 92 is a time delay coil, with a delay preferably of 5 seconds, and switch 93 remains closed for 5 seconds and allows stepping switch coil 69 to step switch 65 from one of its two positions to the other. Since the two positions of switch 65 correspond to the two modes, heating and cooling, of the system 10, the timing device 98 is used to switch the system 10 from one mode to another as will be described later. After a five second delay, relay coil 92 will energize and open switch 95, to de-energize the timing device 98, switch the microswitch 104, and de-energize the stepping coil 69.

Relay coil 88, which closes the relay switch 87 to energize the timing device 98, has one of its terminals connected to the line 54, and the other terminal connected to a normally open movable contact 110 of a relay switch 111 having a relay coil 112 and a stationary contact 113 which is connected to a stationary contact 115 of a microswitch 116, in the drive motor 51. Microswitch 116 has a stationary contact 117 which is normally contacting a movable contact 118 connected to a stationary contact 120 of a relay switch 121 also controlled by the relay coil 112 and having a normally closed movable contact 122 connected to the line 59. Relay coil 112 is connected between line 74 and line 84. Movable contact 118 of the microswitch 116 is connected to a stationary contact 123 of a relay switch 124 having a relay coil 125 and a normally open movable contact 126 connected to the line 59. Stationary contact 117 of the microswitch 116 is connected to one end of the decrease winding 128 of the drive motor 51, the other end of which is connected to the normally closed movable contact 129 of a 30 second time delay relay switch 130 having a relay coil 131 and a stationary contact 132 connected to the line 54. Relay coil 131 is connected between line 54 and line 56. Movable contact 129 of relay switch 130 is also connected to one end of a decrease winding 134 in the drive motor 51. The other end of decrease winding 134 is connected to a stationary contact 135 of a normally closed microswitch 136 having a movable contact 137 connected to a stationary contact 138 of a relay switch 139 controlled by a relay coil 140 and having a normally open movable contact 141 connected to the line 59. Movable contact 129 of switch 130 is also connected directly to a stationary contact 143 of a relay switch 144 controlled by the relay coil 140 and having a normally closed movable contact 145 connected to a stationary contact 147 of a relay switch 148 controlled by the relay coil 125. Relay switch 148 has a movable contact 149 which is connected to the line 54 and which is normally closed against the contact 147. Another stationary contact 150 of switch 148, the normally open contact, is connected to a stationary contact 152 of a stepping switch 153 controlled by the stepping coil 69 and having a movable contact 154 connected through a resistor 155 to the line 59. The resistor 155 is a heating resistor and is located near the half of a thermostat 156 in the temperature sensitive device 24. Resistor 155 is used to supply heat to the bulb of thermostat 156 in anticipation of an increased temperature output of the system 10, to prevent the system 10 from over-reacting to a need for a higher temperature output. A stationary contact 157 of the stepping swich 153 is connected directly to a normally open stationary contact 158 of the relay switch 144.

Relay coil 140 is connected between line 84 and a stationary contact 160 of a single pole double throw double relay switch 161. Relay coil 125 is connected between line 84 and a second stationary contact 162 of switch 161. A movable contact 163 of switch 161 is connected to line 74, and is controlled to contact the stationary contact 163 by a relay coil 165 connected at one end to an end termnial 166 of a variable voltage potentiometer 167 and at the other end to a movable contact 168 of a stepping switch 169 controlled by the stepping switch coil 69. Movable contact 163 of switch 161 is controlled to contact stationary contact 162 by a second relay coil 171 connected at one end to an opposite end terminal 172 of the potentiometer 167 and at the other end to a movable contact 173 of another stepping switch 174 controlled by the stepping switch coil 69.

A stationary contact 176 of the stepping switch 174 is connected to one end terminal 177a of a variable voltage potentiometer 177 in the thermostat 156, the other end terminal 177b of which is connected to a stationary contact 178 of the stepping switch 169. A second stationary contact 179 of the switch 174 is connected to one end terminal 181b of another variable voltage potentiometer 181, the other end 181a of which is connected to a second stationary contact 182 of the switch 169. A movable contact 184 of potentiometer 167 is connected to the line 59 and movable contacts 185 and 186 of potentiometers 177 and 181 are connected to the line 59, to supply a voltage across the bridge formed by potentiometer 167, coils 165 and 171, and either potentiometer 177 or potentiometer 181 depending on the position of the switches 169 and 174, which are controlled by the coil 69. The switches 169 and 174 operate together with switches 153 and 65 to change the system 10 from one mode of operation to the other. When the system 10 is in the cooling mode of operation, movable contacts 168 and 173 contact stationary contacts 178 and 176 respectively to put potentiometer 177 into the bridge circuit. When the system 10 is in the heating mode contacts 168 and 173 contact stationary contacts 182 and 179 respectively to put potentiometer 181 into the bridge circuit. It should be noted that the potentiometers 177 and 181 are connected into the bridge circuit in reverse positions, so that cooling of the thermostat 156 causes the bridge circuit to be unbalanced in opposite directions in the two modes, and likewise for warming of thermostat 156. Thus the switch 161, which is controlled by a current flow due to an unbalance of the bridge circuit, is caused to react to a change of temperature on thermostat 156 by being switched in opposite directions in the two modes of operation, as will be described in detail later in connection with the operation of the whole system 10. The positions of movable contacts 185 and 186 of potentiometers 177 and 181 are controlled by the temperature registered by thermostat 156, cooler temperatures causing the movable contacts 185 and 186 to move to the left, as shown in FIGURE 2, and warmer temperatures causing the contacts 185 and 186 to move to the right. The movable contact 184 of potentiometer 167 is controlled by the drive motor 51 and operates in conjunction with the operation of the variable voltage auto transformer 50. When the motor 51 moves the transformer to a higher voltage position, it moves the contact 184 of potentiometer 167 to the left. As the voltage of transformer 50 is lowered, the contact 184 is moved to the right. Thus, the balance of the bridge formed by the coils 165 and 171 and potentiometers 167 and 177 or 181 is effected by the temperature of thermostat 156 and by the voltage setting on the variable voltage auto transformer 50, as well as by the mode of operation of the system 10. The temperature setting on the thermostat 156 which is required to achieve a bridge balance is a pre-set reference temperature, equal to the desired output temperature of the system 10. The bridge circuit acts as a comparing circuit to compare the temperature sensed by the thermostat 156 with the reference temperature and the difference between these two temperatures is used to control the voltage supplied to the thermoelectric device 11.

The relay coil 45, which controls the triple contact pair relay switch 44, is connected between lines 54 and 56. A second timing device 190 has a timing motor 191 also connected between lines 54 and 56, and line 56 is also connected to a stationary contact 192 of a microswitch 193 in the timing device 190 having a normally open movable contact 194 controlled by the motor 191 and connected to the movable contact 129 of the switch 130. The timing motor 191 is activated when a voltage appears across the lines 54 and 56, due to the closing of switch 58, and the timing motor 191 is designed to operate the switch 193 in such a manner that it closes for a short time interval during a predetermined larger time interval, preferably 1.8 seconds every 37 seconds. The closing of switch 193, when a voltage exists between lines 54 and 56 and when relay switch 130 is open, supplies a voltage to one end of the winding 128 and 134 of the drive motor 51. If the conditions for energization of the motor 51 are satisfied, the timing device 190 supplies a voltage to the motor only 1.8 seconds every 37 seconds, and thus causes the motor to turn only about ½₀ as fast as it would if it received a continuous voltage supply. Since motor 51 turns at a rate of 320° every 256 seconds when supplied a constant voltage, the rate is approximately 16° every 256 seconds when the voltage is supplied through the timing device 190. Thus, since relay coil 131 is a 30 second time delay coil, switch 130 opens 30 seconds after a voltage is applied across coil 131 due to the closing of switch 58, and the motor is supplied its voltage, if at all, through the switch 193 of timing device 190. The rate of increase or decrease of the transformer 50, controlled by motor 51, is thus about 16° every 256 seconds while a charge is taking place, after the first 30 seconds.

In operation the system 10 is turned on by closing the switch 70 of the fan 22 in either the high or low position, which activates the fan motor 71 and causes the fan 22 to force air through the system 10. Prior to the closing of switch 70 to start fan 22, sail switch 79 will be open and circuit breakers 61 and 62 will be in the off position. Let us assume that the system 10 has been shut down in the cooling mode of operation, and that the outdoor temperature is such that, cooling will be required upon start-up. Then cooling relay coil 38 will be energized and the white light 63 will be on. Because sail switch 79 is open, light 80 is on and the 24 volt A.C. control circuit is open. The variable voltage auto transformer 50 will have been driven to its zero position by the motor 51, which will have then been de-energized by means of a cam on the wiper shaft thereof which activates and opens the microswitches 116 and 136 thereof.

Upon turning on fan 22, air circulating through the system 10 causes sail switch 79 near the fan 22 to close. Light 80 is shorted off and 24 volt A.C. power is supplied across the lines 74 and 84, closing relay switch 58 which in turn energizes relay coil 45 closing the triple-contact-pair switch 44 to connect the auto transformer 50 to the rectifier 40. Timing device 190 is activated by the closing of switch 58, and also the 30 second time delay relay coil 131 is activated and the relay coil 112 is activated to close switch 111 and open switch 121. The follow up potentiometer 167 and the potentiometer 177 of the thermostat 156 form a bridge circuit. (In the heating mode, potentiometer 181 would be used with potentiometer 167 to form the bridge circuit.) Since the variable voltage transformer 50 is in its minimum position, the movable contact 184 of potentiometer 167 is positioned at the extreme right side, as shown in FIGURE 2, against the end terminal 166. It has been assumed that the bulb of thermostat 156 is at a higher temperature than the desired output temperature, which may be 55 degrees Fahrenheit, for example, so the movable contact 185 of potentiometer 177 is positioned at the extreme right also. A maximum current therefore flows through the coil 165 and causes the movable contact 163 of relay switch 161 to be positioned against stationary contact 160, thereby energizing relay coil 140. Relay coil 140 closes switch 139 to supply 115 volts across the increase winding 134 of motor 51, to drive the transformer 50 toward its maximum voltage at a rate of 320° every 256 seconds. However, after 30 seconds, the time delay coil 131, which had also been activated as stated above, opens switch 130 and causes the voltage supply across winding 134 to be supplied only through the switch 193 of timing device 190. The motor 51 is therefore controlled by the opening and closing of switch 193 in the timing device, and operates at only ½₀ of its previous rate.

As the output voltage form transformer 50 increases, the D.C. voltage across the thermoelectric modules 26 and 27 increases to cause greater cooling of the incoming air, which in turn begins to cool the bulb of thermostat 156 and cause the movable contacts 185 and 186 of the front and rear pots 177 and 181 to move toward the left. Also, as the motor 51 drives the transformer 50 toward a higher voltage, it drives the movable contact 184 of potentiometer 167 to the left toward end terminal 172. Both of these actions decrease the current in coil 165 until a point is reached where movable contact 163 of switch 161 disengages stationary contact 160 at which time coil 140 is de-energized and switch 139 is opened to de-energize the increase coil 134 of motor 51 and halt the motor movement in the direction of increasing voltage on transformer 50. This increase of voltage on the transformer 50 is halted when the temperature registered by thermostat 156 of the air output is equal to the desired preset temperature, 55° for example.

Since there is a time lag in the cooling of the heat exchange sink 72 and in the cooling of the bulb of thermostat 156, it is likely that the voltage being supplied the modules 26 and 27 when the motor 51 is halted is greater than the voltage required to maintain the desired cooling of the output air, after equilibrium is reached. Thus, as the output air temperature goes below the desired 55°, the movable contact 185 of potentiometer 177 moves to the left and causes a current to flow in the coil 171 of relay 161, and the movable contact 163 engages stationary contact 162 to energize coil 125 and close switch 124. A voltage is then supplied across the decrease winding 128 of motor 51, and the output voltage of auto transformer 50 begins to decrease to lower the rate of cooling of the thermoelectric device 11. However, whenever the decrease winding is energized in the cooling mode (or the increase winding in the heating mode), the heat anticipator resistor 155 of thermostat 156 is energized through switch 153 and closed switch 148 (or through switch 153 and closed switch 144 in the heating mode) to warm the bulb of thermostat 156 in anticipation of the warming effect of the decreased voltage of transformer 50 on the output air. The anticipator resistor 155 prevents the bulb temperature from falling too fast and thus acts like a damping device to prevent continued oscillation of the system 10 about the desired 55° temperature and to allow the system 10 to reach the desired output temperature by approaching it gradually from a slightly lower temperature. The output temperature will then remain at the desired level until a change in the temperature of the surroundings necessitates a change in the cooling level of the system 10.

Now let us assume that with the unit supplying constant 55° output air and with the bridge circuits balanced and the voltage of transformer 50 constant, an increase in the surrounding air temperature occurs. The output air temperature will then increase, the thermostat 156 will cause movable contact 185 to move to the right and unbalance the bridge circuit, current will flow in the coil 165, movable contact 163 will engage contact 160, switch 141 will close, and increase winding 134 of the motor 57 will be energized causing motor 51 to increase the output voltage of transformer 50 and increase the cooling level of the system 10 until another equilibrium position is reached with the output air at a constant 55° temperature and the movable contact 184 of potentiometer 167 at a position farther to the left.

If a decrease in the surrounding air temperature occurs, with the system 10 still in the cooling mode, the movable contact 185 of potentiometer 177 is moved to the right by the cooling thermostat 156 and coil 171 is energized to engage contact 163 with contact 162 in relay 161 and energize coil 125 and the decrease winding 128 of heater 51. The voltage of transformer 50 is then decreased to decrease the cooling of the modules 26 and 27, and the heat anticipator resistor 155 is activated to allow the system 10 to approach gradually a new equilibrium position at a lower cooling level, with the movable contact 184 of potentiometer 167 moved to the right.

Now let us assume that the surrounding air temperature decreases to the desired 55°, so that the voltage of transformer 50 is decreased to a position where no voltage is supplied across the modules 26 and 27. Under these conditions a cam (not shown) on transformer 50 is effective to open the normally closed contacts of microswitch 116 to the decrease winding 128 of drive motor 51, halt the motor 51, and energize the coil 88 through the engagement of movable contact 118 of switch 116 with stationary contact 115 and through the closed switch 111. Energization of coil 88 closes switch 87 and supplies a current through line 90 to the timing device 98, which is activated and begins its timing cycle. If, during the timing cycle the temperature of thermostat 156 goes above 55, indicating a requirement for more cooling, increase winding 134 of drive motor 51 will be energized and the microswitch 116 will be closed to de-energize coil 88 and reset the timing device. If, however, the temperature at thermostat 156 remains below 55° during the whole timing cycle, at the end of the cycle timing motor 102 will switch the movable contact 103 of switch 104 away from contact 106 and into engagement with contact 107, to activate time delay relay coil 92 and stepping coil 69. Stepping coil 69 causes the stepping switches 65, 169, 174 and 153 to switch the system 10 from the cooling mode of operation to the heating mode. Switch 65 de-energizes coil 38 and energizes coil 33 to reverse the polarity of the voltage from transformer 50 across the modules 26 and 27. Switches 169 and 174 cause the oppositely oriented potentiometer 181 to be placed in the bridge circuit controlled by thermostat 156, to cause a change of temperature at thermostat 156 to unbalance the bridge circuit in an opposite manner in the heating mode, as described earlier, so that a decrease in the temperature of thermostat 156 causes an increase in the voltage of transformer 50 and a greater heating of the thermoelectric modules 26 and 27, while an increase in the temperature of thermostat 156 causes a decrease in the voltage of transformer 50 and decreased heating of modules 26 and 27. Stepping switch 153 reverses the logic of the heat anticipating circuit, so that anticipatory heat is supplied to the thermostat 156 when the increase winding 134 of motor 51 is activated, rather than when the decrease winding 128 is activated as in the cooling mode.

Timing motor 102 of the timing device 98 will continue to run after switch 104 is switched, because of the shunt between terminal 101 and terminal 97, until the 5 second time delay relay coil 92 opens switch 93 and de-energizes coils 92 and 69, putting them in a position to be re-activated to change the mode of operation of the system 10 again if the surrounding temperature has risen above 55° after the system is shifted. If the surrounding temperature rises above 55°, a new timing cycle will be instituted by the switch 87, due to the opening of microswitch 116 again and the closing of switch 124 by operation of coil 171 of relay 161. Let us assume, however, that the surrounding temperature remains below 55°, so that heating is required of the system 10. Then movable contact 184 of potentiometer 167 is positioned against the end terminal 166 and movable contact 186 of potentiometer 181 is positioned toward the left side thereof as viewed in FIGURE 2, and current flows in coils 165 of relay 161 to activate coil 140 and close switch 139 to the increase winding 134 of motor 51, to increase the voltage of transformer 50 and increase the temperature of heat exchange sink 72 in the thermoelectric device 11. The switch 144 is also activated by coil 140 to supply a current to the heat anticipating resistor 155, causing the bulb of thermostat 156 to lead the air output temperature in rising toward the desired 55°, as described earlier. When the thermostat 156 reads 55°, a balance is achieved in the bridge circuit which opens switch 161, de-energizes coil 140, and dis-engages the heat anticipator resistor 155 from the circuit. The thermostat 156 will then drop somewhat and cause a slight increase in the voltage from transformer 50, and a re-activation of the anticipator resistor 155. This process will be repeated until the voltage from transformer 50 has risen to an equilibrium level where the output temperature is actually 55° and the heat anticipator resistor is de-activated. This equilibrium level of operation will be maintained until the surrounding temperature changes and causes a change in the temperature of the output air. At this time, the system 10 will react to the temperature change and alter its level of operation to maintain the temperature of output air constantly close to 55°.

It should be noted that the 55° constant temperature can be altered in any one of several ways, the easiest probably being to change the thermostate 156 for one which obtains a balance in the bridge circuit at a lower or higher temperature, when the potentiometer 167 has its movable contact 184 positioned at the terminal 166. The changeover of system 10 from the heating mode to the cooling mode is accomplished in a manner similar to the changeover from the cooling mode to the heating mode as described above. Such a changeover can occur only when the variable voltage auto transformer 50 is at its minimum output level, for only then is the microswitch 116 activated and only then may the timing cycle of timing device 98 be started. If the variable voltage transformer 50 moves from its minimum position, the timing cycle will be interrupted and the unit will remain in the mode it is already in.

While the system 10 is designed for continuous operation, it may be shut down quite easily, simply by opening the switch 70 to the fan 71 and thus cutting off fan 71. When switch 70 is placed in its center position, fan 71 is no longer connected to the 115 volt A.C. power source, and no air is forced through the system 10. Sail switch 79 opens and interrupts the 24 volt A.C. power supply to the control system 12. Relay coils 73 and 45 are de-energized to stop the voltage supplied to the bridge rectifier 40 and thermoelectric device 11. Relay coil 33 or relay coil 38, with the appropriate light 67 or 63 will remain energized, depending upon which mode the system 10 was in when it was shut down. Relay coil 131 will de-energize to shunt timing device 190, causing drive motor 51 to revert to its original traverse speed of 320° every 256 seconds, and decreasing the voltage of transformer 50 because relay coils 125 and 140 are both de-energized. On reaching the minimum voltage position, the wiper shaft on transformer 50 engages the minimum voltage cam to open microswitch 116 and stop drive motor 51. The system remains in this condition until it is restarted. Note that de-energization of both relay coils 125 and 140 removes the heat anticipator resistor 155 from the circuit also.

Certain safety devices are used in the system 10, particularly to shut it down in case of failure of certain parts. The series switches 82 are located in the thermoelectric sub-assembly and open in case of a failure or overheating of the heat sinks therein, shutting down system 10 and lighting light 83. The switches 82 may be set to open at a nominal temperature of 130° F. and close at a nominal temperature of 100° F. In addition, sail switch 79 opens to shut down the system 10 when there is no air circulating through the system 10. If circuit breakers 61 or 62 become temporarily overloaded they will trip out, and the system 10 will temporarily cease to operate, but transformer 50 will not return to its minimum position. Should this occur, circuit breakers 46, 47 and 48 should be tripped out also before circuit breakers 61 and 62 are reset.

FIGURE 3 shows a diagrammatic view of an alternate fan motor construction for the fan 22 wherein four fan motors 200 each have one terminal 201 connected to the line 54 from the 115 volt A.C. power supply. Each fan motor 200 also has one terminal 202 connected to one of four stationary terminals 203 on one side of a four pole triple throw switch 204, and one terminal 205 connected to one of four stationary terminals 206 on the other side of the switch 204. Two movable contacts 207 of the switch 204 are connected through a circuit breaker 208 to the line 59 from the 115 volt A.C. power supply, and two movable contacts 209 of switch 204 are electrically connected through a circuit breaker 210 to the line 59. With this construction of fan motors 200 for fan 22, the fan 22 may be placed in the off position, where contacts 207 and 209 do not engage either contacts 203 or contacts 206; or fan 22 may be placed in operation at high speed, where contacts 207 and 209 engage contacts 203; or fan 22 may be placed in operation at low speed, where contacts 207 and 209 engage contacts 206.

FIGURE 4 shows a circuit diagram of an alternative construction of a portion of the control system and power supply for the thermoelectric device 11 of system 10. In this construction a magnetic amplifier 310 is substituted for the variable voltage auto transformer 50 to supply power to the thermoelectric device 11. In particular the magnetic amplifier 310 is connected through a transformer 311 and a main circuit breaker 312 to a 3-phase, 230 volt, 60 cycle A.C. voltage supply. Three output lines 313, 314, and 315 from magnetic amplifier 310 are connected through a fuse system 316 to a 3-phase diode rectifier 317 having outputs connected through a relay switch 318 to the thermoelectric device 11. Relay switch 318 is a four pole switch having two contacts 319a, normally engaged, connected between the two outputs of the bridge rectifier 317 and the two end terminals of the thermoelectric device 11, and two contacts 319b, normally disengaged, connected between the two outputs of the rectifier 317 and the opposite two end terminals of the thermoelectric device 11. When contacts 319a are engaged, the switch 318 is in a position corresponding to the cooling mode of operation. When contacts 319b are engaged, the switch 318 is in a position corresponding to the heating mode of operation.

The output of magnetic amplifier 310 is controlled by an input 320 from a thermostatic control circuit 321. Thermostatic control circuit 321 includes stepping switches 322 and 323 having movable contacts 324 and 325 connected to the magnetic amplifier 310 for receiving an A.C. voltage thereacross. The switches 324 and 325 are controlled by a stepping relay coil 327, along with a switch 328. A first position of the switches 324, 325 and 328, the position shown in FIGURE 4 corresponds to the cooling mode of operation of the system 10. A second position of switches 324, 325 and 328, opposite that shown in FIGURE 4, corresponds to the heating mode of operation of the system 10. Stationary contacts 330 and 331 of switches 324 and 325, the contacts engaged in the cooling mode of operation, are connected across the end terminals 332 and 333 of a potentiometer 334, while stationary contacts 336 and 337, the contacts engaged in the heating mode of operation, are connected oppositely to the end terminals 333 and 332 of potentiometer 334. A movable contact 338 of potentiometer 334 is connected to the input 320 of magnetic amplifier 311, and is mechanically connected also to a thermostat 339, which is located near the thermoelectric device 11 in contact with conditioned air from the device 11. The thermostat 339 senses the temperature of the output air from the system 10, and controls the position of movable contact 338 of potentiometer 334 in response thereto. The voltage at input 320 is controlled by the position of movable contact 338 on potentiometer 334, which is controlled by the temperature registered by thermostat 339, and this voltage controls the output voltage of magnetic amplifier 310. In the cooling mode of operation, a temperature above the desired 55° causes an increase in output voltage of the magnetic amplifier 310, while a temperature below the desired 55° causes a decrease in the output of magnetic amplifier 310. In the heating mode of operation of system 10, temperature changes on thermostat 339 cause opposite changes in the output voltage of magnetic amplifier 310.

A stationary contact 341 of stepping switch 328, the contact engaged in the heating mode of operation, is connected to one end of a relay coil 342, which controls the switch 318 and the other end of which is connected to a line 343, which is connected to one end of the secondary coil of a transformer 344. The primary winding of transformer 344 is connected through a circuit breaker 345 to a 115 volt A.C. power supply. The other end of the secondary winding of transformer 344 is connected to a line 345, and a 24 volt A.C. voltage is produced by the secondary winding and is supplied between the lines 343 and 345. A movable contact 347 of the stepping switch 328 is connected to the line 345, so that when the switch is in the heating mode position, with contact 347 engaging contact 341, a 24 volt A.C. voltage is supplied across the relay coil 342 to energize switch 318.

One end of the stepping switch coil 127, which controls the stepping switches 322, 323 and 328, is connected to line 343, while the other end is connected to a stationary normally open contact 350 of in timing device 351. A stationary normally closed contact 352 of timing device 351 is connected through a timing motor 353 to the line 343 and to one end terminal of a timing clock 354, while a movable contact 355 is connected to the other terminal of timing clock 354 and to a stationary normally closed contact 357 of a relay switch 358 having a movable contact 359 connected to the line 345. Relay switch 358 is controlled by a coil 361, which has one end connected to the positive terminal of a Zener diode 362 and to the negative output terminal of a diode single phase full wave bridge rectifier 363. The other end of coil 361 is connected to the negative terminal of the Zener diode 362 and through a voltage dividing resistor 364 to the positive output terminal of the rectifier 363. The inputs of rectifier 363 are connected to output terminals 314 and 315 of the magnetic amplifier 310, to receive voltage from these outputs and to control the mode of operation of the system 10 in response to the voltage received.

Since the variable voltage auto transformer 50 of the embodiment shown in FIGURE 2 is replaced by the magnetic amplifier 310 in the embodiment of FIGURE 4, a different method of control over the mode of operation and the level of operation of system 10 must exist. The essence of this control method is to activate a process for changing the mode of operation of the system 10 when the output voltage of magetic amplifier 310 falls below a certain very low level, corresponding to an outside temperature which requires no operation of the system 10 in its present mode and possibly requires its operation in the opposite mode. The stepping switches 322 and 323, and the potentiometer 334 and thermostat 339 control the level of operation of the embodiment of FIGURE 4, as described earlier. The mode of operation of this embodiment is controlled by the output voltage level of magnetic amplifier 310, as taken across the lines 314 and 315. The output voltage across lines 314 and 315, which may vary from about 3 volts to 115 volts, is one half the output voltage of magnetic amplifier 310. This voltage is rectified by the bridge rectifier 363 and is applied across the voltage dividing resistor 364 and the relay coil 361 and Zener diode 362. Resistor 364 reduces the voltage across the coil 361 and Zener diode 362, and Zener diode 362 limits the voltage across relay coil 361 to protect it from overloading. As long as the output voltage of magnetic amplifier 310 remains high, the portion of that voltage which is applied across relay coil 361 keeps coil 361 energized, and timing device 351 is not energized. When the voltage of magnetic amplifier 310 falls below about 12 volts, the portion of that voltage applied across relay coil 361 will no longer keep relay switch 358 energized, and contact 359 engages contact 358 to activate timing device 351, which begins a timing cycle of perhaps 30 seconds. If during this timing cycle, the voltage output of magnetic amplifier 310 rises above the voltage required to activate switch 358, the circuit to timing device 351 is opened, the timing cycle is interrupted, and timing device 351 is reset. If, however, the output voltage of magnetic amplifier 310 remains below about 12 volts during the complete timing cycle, timing motor 354 causes the movable contact 355 to engage contact 350, energizing stepping coil 327 which switches the mode of operation of the system 10 from one mode to the other. When the output voltage of magnetic amplifier again increases above the level required to energize relay coil 361, the switch 358 is opened to de-energize coil 327 and reset the timing device 351 for another possible switch in the mode of operation of the system 10.

While preferred embodiments of the invention have been specifically disclosed, it is to be understood that the invention is not limited thereto as other variations will be apparent to those skilled in the art and the invention is to be given its fullest possible interpretation within the terms of the following claims.

I claim:

1. In a thermoelectric system for controlling the temperature of a substance associated therewith, the combination comprising: thermoelectric module means having two terminals thereon and having one portion adapted to be positioned in proximity with the substance to facilitate heat transfer therebetween; voltage supply means for supplying a D.C. voltage across said two terminals of said thermoelectric module means; temperature sensitive means adapted to be positioned in proximity with the substance to sense the temperature thereof; control means connected to said voltage supply means for controlling the voltage supplied by said voltage supply means across said two terminals of said thermoelectric modules means to maintain the temperature of the substance at a predetermined substantially constant level, said control means including means for reversing the polarity of said D.C. voltage across said two terminals of said thermoelectric module means, said control means including comparing means for comparing the temperature sensed by said temperature sensitive means with a reference temperature and for producing an output signal in response to the difference between said two temperatures, said voltage supply means including a variable voltage auto transformer and rectifying means for converting the output voltage of said variable voltage auto transformer to a D.C. voltage, and said control means including means connected to said variable voltage auto transformer and to said comparing means and operative to vary said output voltage of said transformer in response to variations in said output of said comparing means.

2. In a thermoelectric system as defined in claim 1, said voltage supply means including a magnetic amplifier, and rectifying means for converting the output voltage of said magnetic amplifier to a D.C. voltage, and said control means including means connected to said magnetic amplifier and to said comparing means and operative to vary the output of said magnetic amplifier in response to variations in said output of said comparing means.

3. In a thermoelectric system as defined in claim 2, means connected to the output of said magnetic amplifier for reversing the polarity of said D.C. voltage across the two terminals of said thermoelectric module.

4. In a thermoelectric system as defined in claim 3, said means for reversing the polarity of said D.C. voltage comprising a voltage dividing means connected to the output of said magnetic amplifier.

5. In a thermoelectric system as defined in claim 3, and means for reversing the polarity of said D.C. voltage comprising a relay switch having a relay coil connected to the output of said magnetic amplifier and having a Zener diode connected across said relay coil of said relay switch to protect it from overloading.

6. In a thermoelectric system as defined in claim 3, said means for reversing the polarity of said D.C. voltage comprising second rectifying means connected to the output of said magnetic amplifier.

7. In a thermoelectric system as defined in claim 1, said system having a first mode of operation when said one portion of said thermoelectric module means is cooled by the application of said voltage across said two terminals of said thermoelectric module means and a second mode of operation when said one portion of said thermoelectric module means is heated by the application of said voltage across two terminals of said thermoelectric module means, said control means comprising a timing device connected to said voltage supply means, comparing means for comparing the temperature sensed by said temperature sensitive means with a reference temperature and for producing an output signal in response to the difference between said two temperatures, and means for energizing said timing device when the output of said voltage supply means is below a predetermined level and the output of said comparing means decreases below a predetermined output and means for reversing said system from one mode of operation to the other mode of operation when the output of said comparing means is still below said predetermined output after said timing device has registered the passage of a certain period of time.

8. In a thermoelectric system as defined in claim 1, a heat anticipating circuit connected to said control means and operative to supply heat to said temperature sensitive means for a short period of time whenever said control means operates to increase the temperature of said one portion of said thermoelectric module means.

References Cited
UNITED STATES PATENTS

| | | | |
|---|---|---|---|
| 3,031,855 | 5/1962 | Martz | 62—3 |
| 3,077,079 | 2/1963 | Pietsch | 62—3 |
| 3,091,939 | 6/1963 | Baude | 62—3 |
| 3,091,940 | 6/1963 | Feldman | 62—3 |
| 3,107,324 | 10/1963 | Wright | 62—3 |
| 3,111,008 | 11/1963 | Nelson | 62—3 |
| 3,121,998 | 2/1964 | Nagata | 62—3 |
| 3,155,157 | 11/1964 | Anderson | 62—3 |
| 3,204,418 | 9/1965 | Mathews | 62—3 |
| 3,330,970 | 7/1967 | Wennerberg | 62—3 |

WILLIAM J. WYE, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,438,214                          April 15, 196

Karl V. Schmittle

It is certified that error appears in the above identified patent and that said Letters Patent are hereby corrected as shown below:

Column 13, line 19, "and" should read -- said --.

Signed and sealed this 7th day of April 1970.

(SEAL)
Attest:

Edward M. Fletcher, Jr.                     WILLIAM E. SCHUYLER, JR
Attesting Officer                              Commissioner of Patents